United States Patent [19]

Blow et al.

[11] Patent Number: 5,684,615
[45] Date of Patent: Nov. 4, 1997

[54] OPTICAL SYSTEM

[75] Inventors: Keith J. Blow, Woodbridge; Kevin Smith, Ewarton, both of United Kingdom

[73] Assignee: British Telecommunications public limited company, London, England

[21] Appl. No.: 513,972

[22] PCT Filed: Aug. 10, 1994

[86] PCT No.: PCT/GB94/01750

§ 371 Date: Sep. 7, 1995

§ 102(e) Date: Sep. 7, 1995

[87] PCT Pub. No.: WO95/04952

PCT Pub. Date: Feb. 16, 1995

[30] Foreign Application Priority Data

Aug. 10, 1993 [GB] United Kingdom ............... 9316586
Aug. 24, 1993 [GB] United Kingdom ............... 9317550

[51] Int. Cl.$^6$ ................................................. H04B 10/12
[52] U.S. Cl. ........................... 359/173; 359/161; 359/179
[58] Field of Search ............................. 359/173, 179, 359/180, 183, 264, 161, 344, 341

[56] References Cited

U.S. PATENT DOCUMENTS 5,191,628  3/1993  Byron ......................................... 355/27
5,311,351  5/1994  Chesnoy .................................... 359/264
5,477,375 12/1995  Korotky et al. .......................... 359/264
5,502,588  3/1996  Abram ....................................... 357/154

OTHER PUBLICATIONS

Francois et–al, Reduction of averaged soliton interaction forces by amplitude modulation, Optics Letters, vol. 18 No. 8 15 Apr. 1993 (all).

H. Kubota et al, 'soliton transmission control in time and frequency domains', IEEE Journal of Quantum Electronics. (all).

N. J. Smith et al, 'Suppression of soliton interactions by periodic phase modulation', Optics letters vol. 19, No. 1 Jan. 1, 1994 (all).

N.J. Smith et–al, 'Soliton dynamics in the presence of phase modulators' Optics Communications vol. 102, 324–238, 1993.

Dianov et–al, Influence of frequency modulation on the interaction of pulses in fiber waveguides, Quantum Electron, Aug. 1986 pp. 1148–1150.

Wabnitz, Suppression of soliton interactions by phase modulation, Electronics Letters Sep. 16, 1993 No. 19 pp. 1711–1713.

Georges et–al, Modulation, filtering, and initial phase control of interacting solitons, J. Opt. Soc. Am. B/vol. 10, No Oct. 1993.

Maruta et–al, Suppression of interaction between adjacent optical dark solitons by means of synchronized phase modulation, Optics letters, vol. 20, No. 17 Sep. 1, 1995.

Francois et–al, 'Reduction of averaged soliton interactions' Opt. letter, vol. 18 No. 8 15 Apr. 1993.

Kubota et–al, 'Soliton transmission control in time and frequency'IEEE Journal of Quantum Electronics vol. 29 No. 77/93.

*Primary Examiner*—Wellington Chin
*Assistant Examiner*—Rafael Bacares
*Attorney, Agent, or Firm*—Nixon & Vanderhye P.C.

[57] ABSTRACT

The invention relates to the control of soliton-soliton interaction through the application of a positive phase shift. For each soliton width there is a critical phase modulation level above which soliton-soliton interaction can be virtually eliminated. This enables the spacing between adjacent solitons to be reduced, increasing the system bandwidth even for long transmission distances. The invention finds application in submarine and other long haul systems.

17 Claims, 5 Drawing Sheets

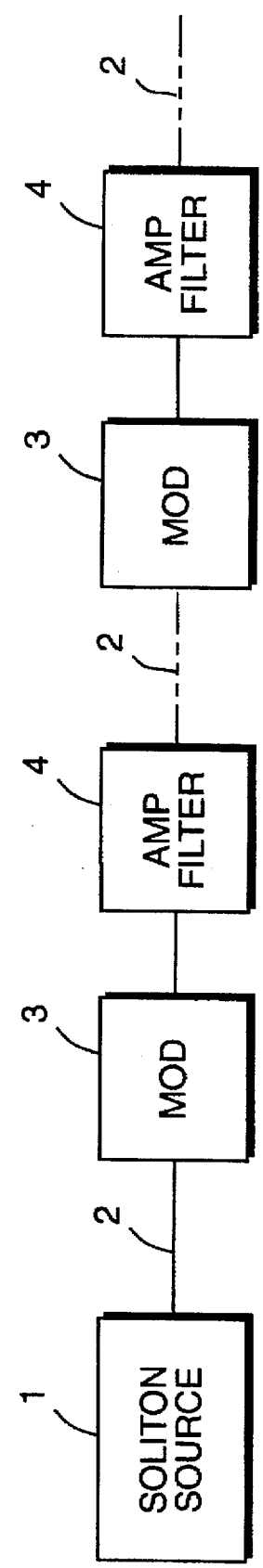

OPTICAL SYSTEM

FIELD OF THE INVENTION

The present invention relates to optical systems and in particular optical systems within which optical solitons are propagated.

BACKGROUND OF THE INVENTION

The word soliton was first coined by Kabusky and Kruskal to describe the particle-like behaviour of the solitary wave solutions of the numerically treated Korteweg-deVries equation. Now, more than 100 different non-linear partial differential equations exhibit soliton-like solutions. Optical solitons belong to the class of envelope solitons and can be described by the non-linear Schroding (NLS) equation.

Hasegawa and Tappert in 1973 were the first to show theoretically that, in an optical fibre, solinary waves were readily generated and that the NLS equation description of the combined effects of dispersion and the non-linearity self-phase modulation, gave rise to envelope solitons. It was not until seven years later, in 1980 that Mollenauer and co-workers first described the experimental realization of the optical soliton, the delay primarily being due to the time required for technology to permit the development of low loss single-mode fibres. Since 1980 there has been tremendous research effort in the field of optical solitons, the research being driven by the promise of massively increased bit rates, through the application of ultra short soliton pulses in long-distance optical communication networks. In addition, solitons are attractive for use in ultra fast optical switching and processing, primarily based on interferometric techniques.

Unfortunately, additional non-linearities which had not been considered originally have put limits on potential systems for long distance optical communication. Nevertheless, it is likely that optical soliton systems for long distance optical communication, for example transatlantic systems, will be installed within five years or so. Nevertheless, the raising of the limits on transmission distance remains a focus of much research. Similarly, the related problem of stability in switching and storage systems which use optical solitons is a major focus of much current research.

One of the main constraints on the design of optical fibre soliton communication systems is the interaction force which exists between adjacent pulses in the bit stream, see J P Gordon, Optics Letters, 8, (1983), page 596; K J Blow, N J Doran, Electronics Letters, 19, (1983), 429–430; P L Chu, C Desem, Electronics Letters, 19, (1983), 956–957. It has been shown that bandwidth filtering or temporal modulation are effective means of combatting the other source of timing errors in such systems, namely Gordon-Haus jitter. However, spectral filtering has relatively little effect on the interaction forces when proper account is made of the evolved pulse parameters, see M Nakazawa, H Kubota, Electronics Letters, 20, 28, (1992), 958–960. Wabnitz has shown, Optics Letters, 18, (1993), 601–603, in the context of a ring cavity, that the interactions may be controlled by the injection of a low amplitude cw wave; however this technique is less suited for use in transmission systems. Recently Francois Georges examined, Optics Letters, 18, (1993) 583–585, the use of a combined phase and amplitude modulation cycle to suppress the interactions. In that work neighbouring pulses were placed at opposite extrema of the phase modulation component, thus breaking the coherence between them. The modulation function in, question was however, somewhat unphysical. Additionally the present inventors have shown elsewhere that one extremum of a phase modulator's cycle enhances the Gordon-Haus jitter, see N J Smith, K J Blow, D J Firth, K Smith, Optics Communications, Vol. 102, 324–238, 1993.

In our above-mentioned paper, we disclose that a positive phase modulation may be used to reduce Gordon-Haus jitter. However, as indicated above in relation to bandwidth filtering and temporal modulation, while techniques have been devised for controlling Gordon-Haus jitter, the control of soliton-soliton interactions has proved to be much more difficult.

SUMMARY OF THE INVENTION

Surprisingly, the inventors have discovered that it is possible to control soliton-soliton interaction by applying phase modulation in an appropriate fashion. In this way it is possible to increase the interaction lengths dramatically.

According to the present invention there is provided a method of propagating optical solitons in which a positive phase modulation is imposed on solitons after they have propagated at least 30 kilometers along an optical fibre transmission path, the amount of phase modulation imposed being sufficient to maintain the temporal separation between adjacent solitons so that significant soliton-soliton interactions are avoided.

In a second aspect the present invention provides an optical transmission system in which phase modulation is applied to increase the interaction length for optical solitons propagating in the system.

According to a further aspect the present invention provides a submarine communication system as in comprising an optical fibre communications path at least 1,000 miles in length which includes a plurality of phase modulators 3 spaced along the fibre communication path, which phase modulators impose a phase modulation sufficient to prevent significant interaction between solitons propagated along the fibre 2. According to a further embodiment the present invention provides an optical fibre ring or loop within which at least one optical soliton circulates, the loop including at least one phase modulator which imposes a phase modulation sufficient to ensure the stability of the system.

In a further aspect the present invention provides an optical communications system comprising a source of optical solitons 1 coupled to an optical fibre transmission path 2, the optical fibre transmission path including a phase modulator 3, the phase modulator being modulated in use at a frequency such that adjacent solitons pass through consecutive upchirped peaks of the modulation cycle, the modulator inducing corrections to a soliton frequency in response to changes in the soliton's temporal position.

According to a further aspect the present invention provides a method or apparatus in which solitons are exposed to phase modulation above the critical level, whereby soliton-soliton interactions are substantially reduced.

BRIEF DESCRIPTION OF THE DRAWINGS

Embodiments of the invention will now be described with reference to the accompanying drawings in which:

FIG. 6 is a block diagram of a communication system in which the soliton-soliton interaction is controlled.

DETAILED DESCRIPTION OF THE DRAWINGS

Figure 1:
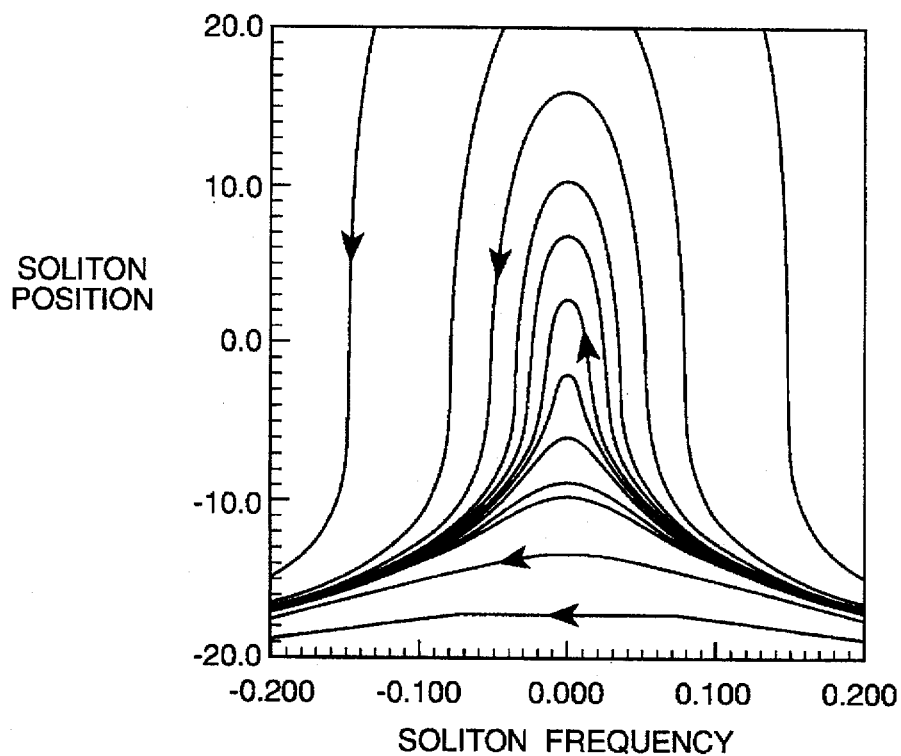
FIG. 1a is a plot of soliton frequency against soliton position in the form of a phase space portrait.
FIG. 1b is a similar plot showing the phase space portrait when no equilibrium points occur.
Figure 1:
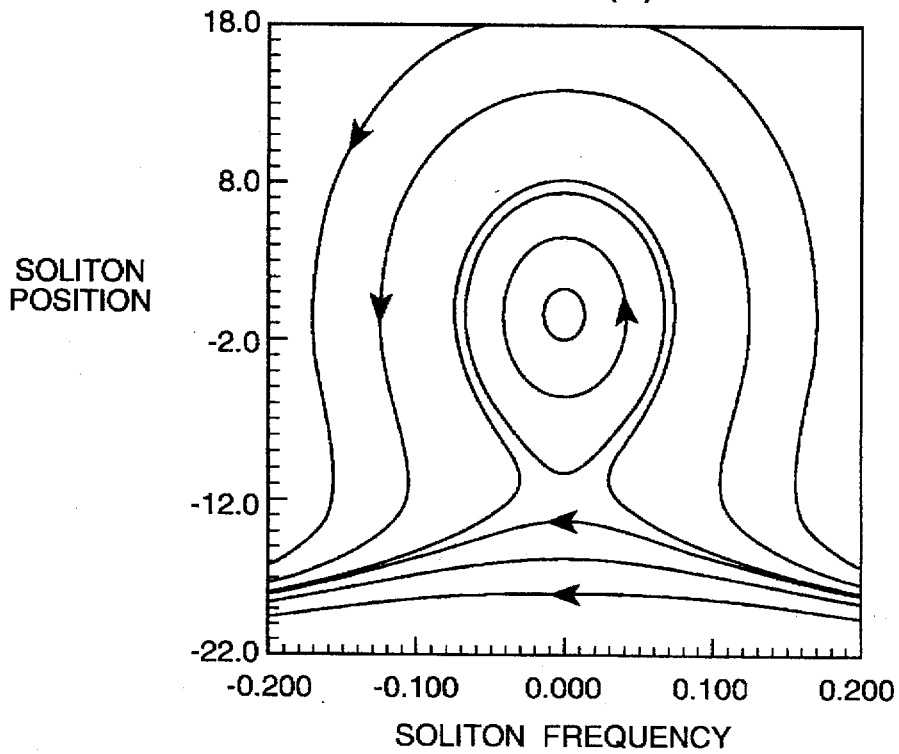

An isolated pair of in phase solitons, $$u = A\,\text{sech}((t-T_0)/\tau) + A\,\text{sech}((t+T_0)/\tau) \quad (1)$$

undergo a bound oscillation, the first collision occurring at a distance $z_0$–$(z_0/2)$ exp $(T_0/\tau)$, where $Z_0$ is the soliton period. There are two possible approaches when solving the initial value problem to the non-linear Schrodinger equation (NLSE) posed by equation 1. The full second order soliton solution may be constructed, for example using the (non-degenerate) eigenvalues of the inverse scattering transform [1, 7, 8]. Alternatively, the dynamics may be regarded as composed of two identical individual solitons, each acting as a perturbation on the other [10]. The latter scheme readily admits the incorporation of extra effects, such as external modulation, and is employed here. The method is valid only when the two pulses do not strongly overlap; thus it is useful for small motions around initially separate positions and the stability thereof, which is the main concern here. Our scheme, as illustrated in FIG. 6, is to place phase modulators 3 periodically along the optical fibre 2, and to set the modulation frequency such that adjacent solitons pass through consecutive upchirped peaks of the modulator cycle. (The use of truly consecutive upchirped peaks is of course not essential. One could run the modulator at twice this rate, or some higher multiple of it, so that some peaks do not 'see' solitons. This would require a modulator capable of running at the higher rate, and there would appear to be little to gain from this approach.) The modulator induces corrections to a soliton's frequency, and hence speed, in response to change in its temporal position caused by the interaction forces. If these affects combine to produce a stable equilibrium position, collisions between solitons will be suppressed. If no equilibrium point exists, then the global behaviour (ie collision) will not be averted. Because the interaction forces decrease exponentially with separation, only nearest neighbour effects need to be considered. An isolated pair is the worst case scenario, and so our model applies to both random bit patterned and uniform sequences of solitons. Using the perturbational methods [10], ordinary differential equations may be derived for the parameters of each soliton, $u_s = (A/\tau)\,\text{sech}\,((t-T_i)/\tau)\,e^{i\omega_i 1}$, for i=1, 2:

$$\frac{d\omega_i}{dz} = (-1)^i \frac{4\ddot{\beta}}{T^3}\,e^{-r/T} - 2\alpha_m(T_i - T_{io}), \quad (2)$$

$$\frac{dT_i}{dz} = \ddot{\beta}\,\omega_i \quad (3)$$

Here $r = T_1 - T_0$ is the pulse separation, and $T_{io}$ the peaks in the modulation cycle. For modulators with spacing 1 and transfer function $u_{out} = u_{in}$ exp (i$\Phi$ cos $(\omega_m t)$), $\alpha_m = \Phi \omega_m^8/21$. In the light of our previous work, both solitons are initially placed at upchirped peaks of the modulator cycle. It has been assumed that the modulators are spaced sufficiently closely to average their action over the length of the fibre. As the motion is symmetric, attention will be focused on the i=1 soliton and the subscripts dropped. Note that now r=2T.

Introducing $\Delta T = T - T_0$, $$\frac{d\omega}{dz} = -\frac{4\ddot{\beta}}{\tau^3}\,e^{-2(T_0+\Delta T)/\tau} - 2\alpha_m \Delta T \quad (4)$$

$$\frac{d\Delta T}{dz} = \ddot{\beta}\,\omega \quad (5)$$

Examination reveals that equation 4 may have either 0 or 2 fixed points, depending upon the strength of $\alpha_m$. The consequence of the point's existence is that a harmonic potential well is present, around which the soliton's frequency and position perform a closed orbit, as shown by the phase space portrait in FIG. 1a. Provided the initial point lies inside the separatrix the two pulses each remain trapped in their separate potentials, ie modulator cycle peaks. When no equilibrium points occur the phase space is as illustrated in FIG. 1b, and the soliton's interaction is essentially unimpeded. In the language of non-linear dynamics, the two cases are separated by a subtle-node bifurcation; the singularity at the critical point being terms cuspoidal.

Figure 2:
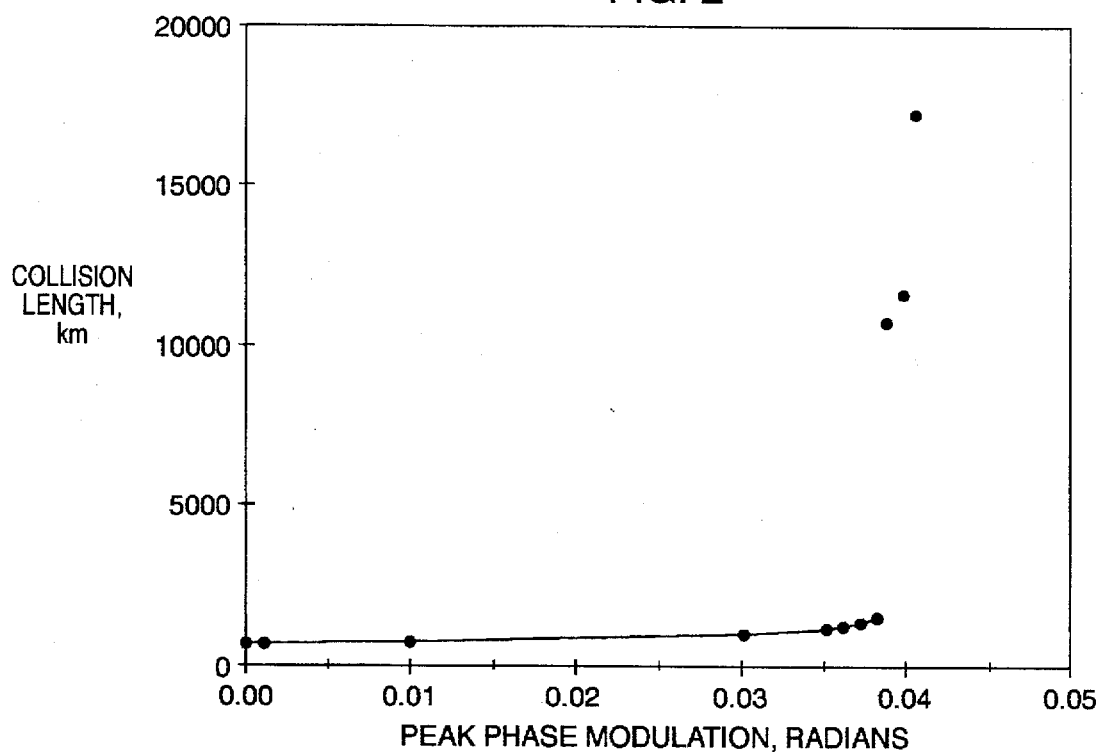
FIG. 2 is a plot of the observed collision lengths as a function of applied modulator strength.

These predictions are confirmed by the results of a numerical integration of the full NLSE completely with periodically spaced phase modulators. The observed collision lengths are plotted in FIG. 2 as a function of applied modulator strength. The parameters used are $\tau = 6.25$ ps approximately equal to 10 ps FWHM, $T_0 = 20$ ps, $\ddot{\beta} = 1.25$ ps$^2$ per kilometer, $1_m = 30$ km and $\omega_m = 2\pi$. 25 GHz. Below the critical point, the phase modulator only changes the collisions length by factors of less than 3. Above the critical point the collision lengths rise very rapidly indeed with increased modulation. The phase space diagram suggests that in this region the collision lengths should be infinite; however examination of the full field profile show that over long distances the pulse pairs develop some asymmetry, followed by an interaction. This is inconsistent with the perturbation theory, but is to be expected due to the non-degenerate IST eigenvalues and the imaginary (ie reactive) coefficient of the modulator term.

It remains to calculate the bifurcation point. Notice that at the critical value of $\alpha_m$, the two functions on the right hand side of equation 4 intersect tangentially. Thus the derivative with respect to $\delta T$ is then also 0:

$$0 = \frac{4\ddot{\beta}}{\tau^3}\,\frac{2}{\tau}\,e^{-2T_0/\tau}e^{-2\Delta T/\tau} - 2\alpha_m \quad (6)$$

Solving these two conditions as simultaneous equations gives, $$\Delta T = -\frac{\tau}{2} \quad (7)$$

$$\alpha_m = \frac{4\ddot{\beta}}{\tau^4}\,\exp\left(1 - \frac{2T_0}{\tau}\right) \quad (8)$$

Figure 3:
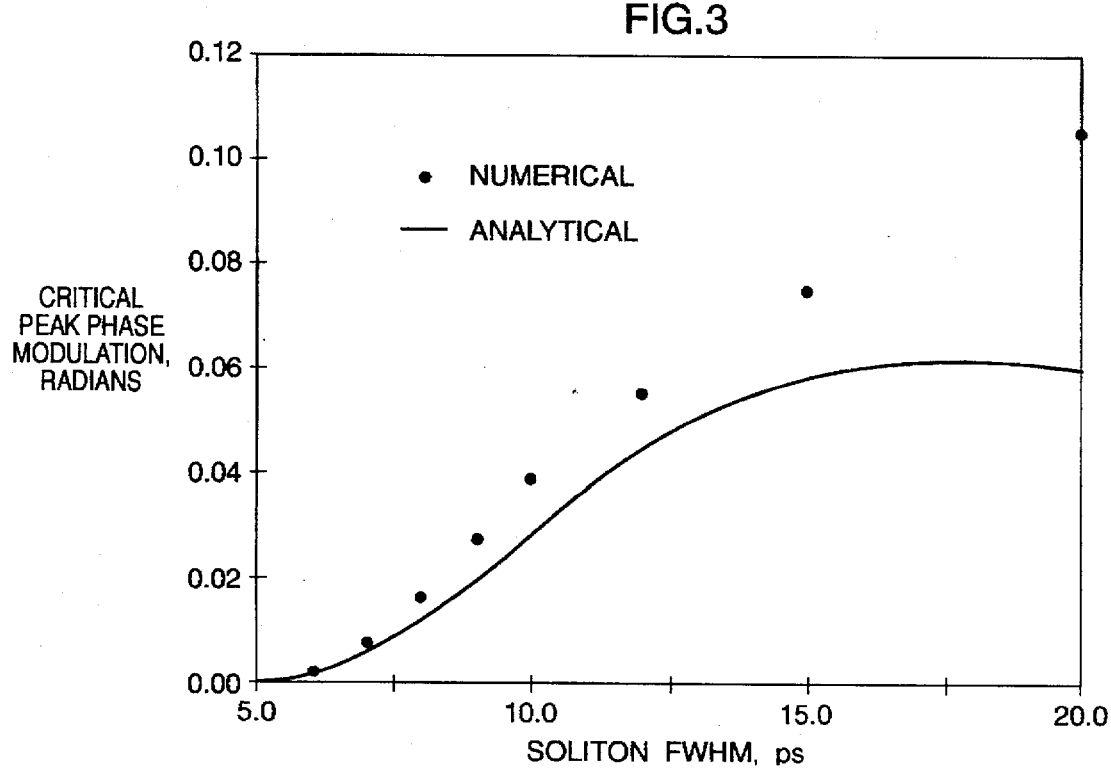
FIG. 3 is a plot of critical peak phase modulation against soliton width.
Figure 4:
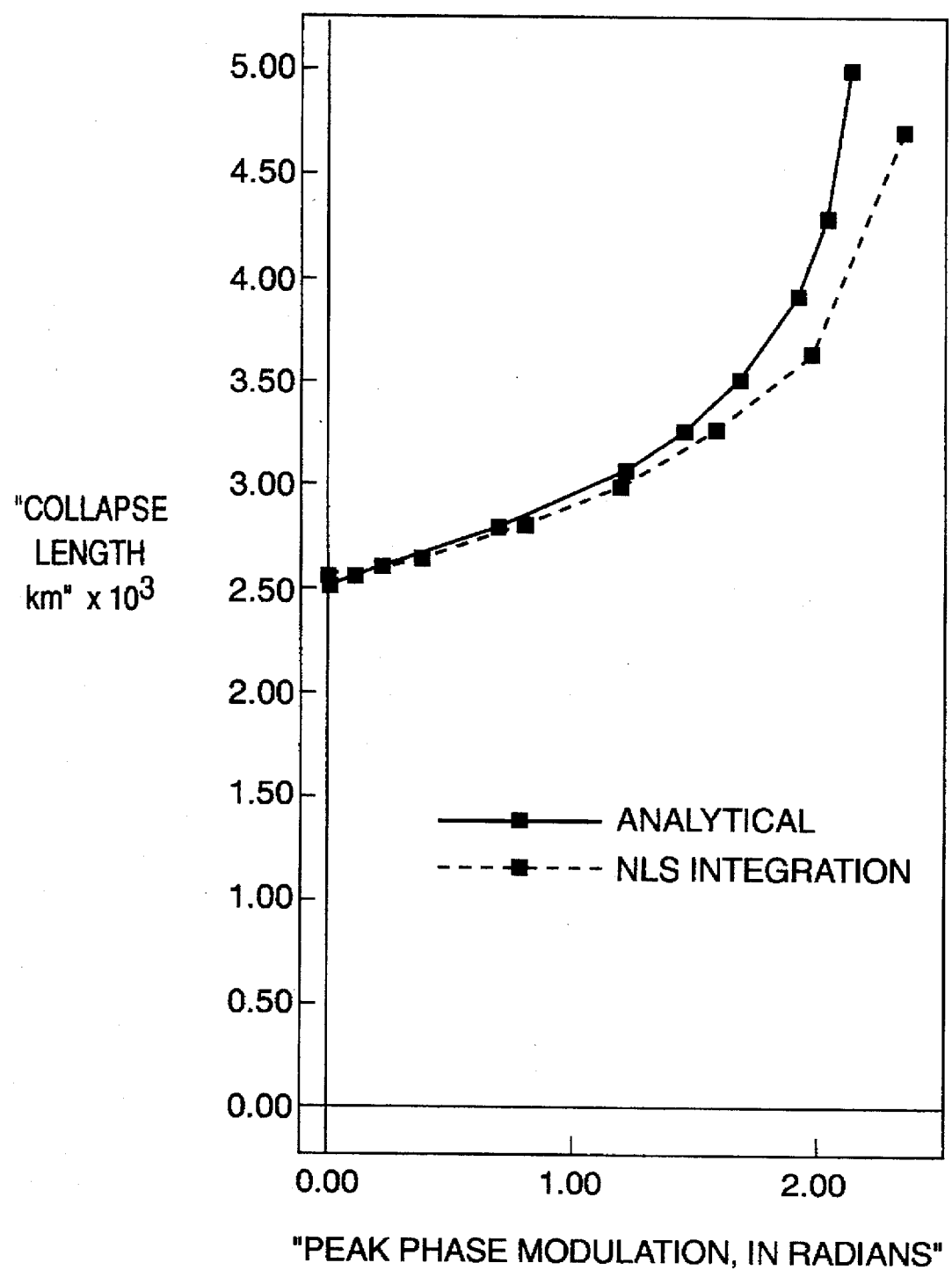
FIG. 4 is a plot of collision lengths of 6 ps solitons separated by 40 ps as a function of imposed positive phase modulation.
Figure 5:
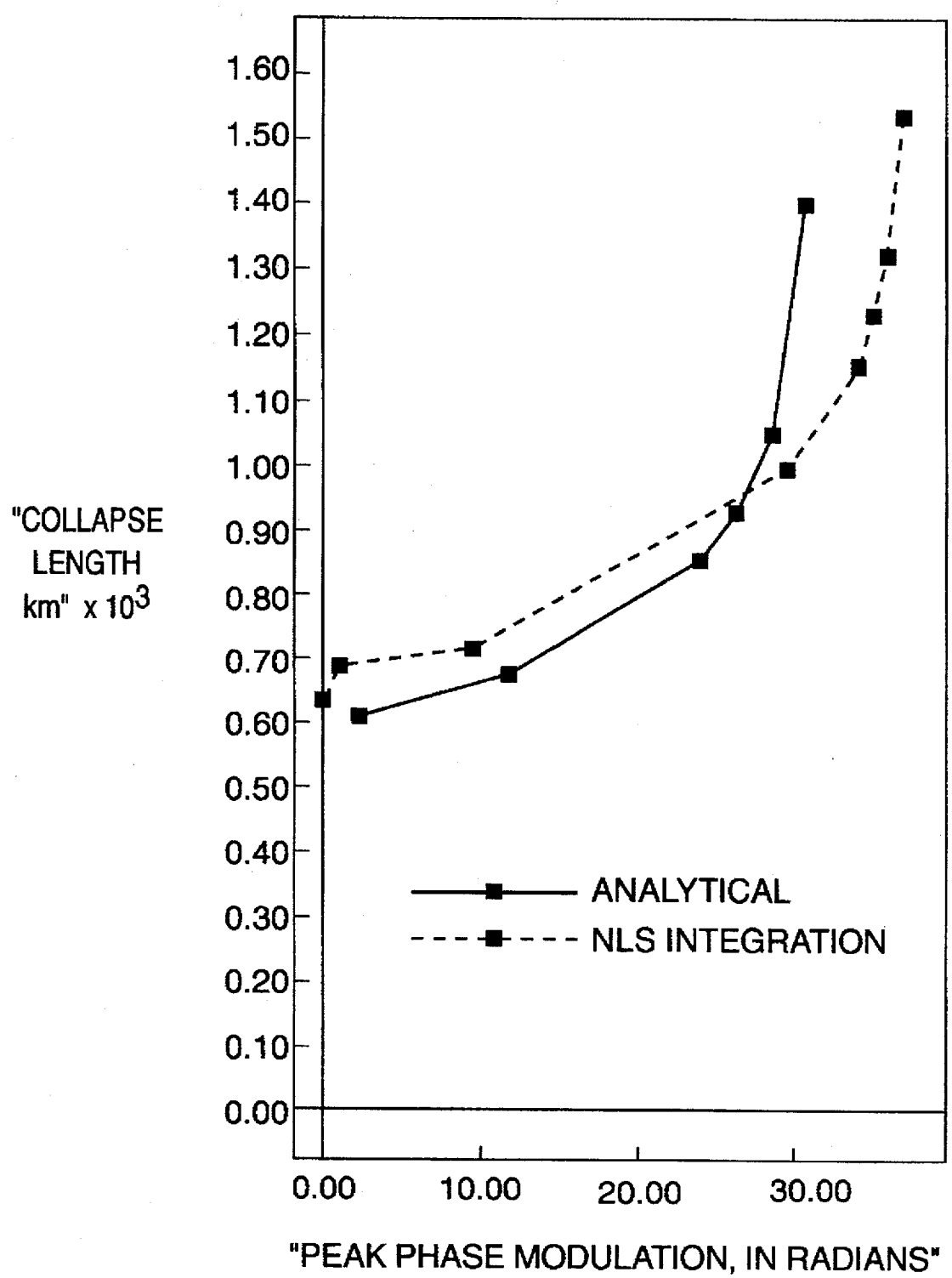
FIG. 5 is a similar plot for 10 ps solitons.

The value of $\Phi$ implied by equation 8 is plotted in FIG. 3 as a function of pulse width with $T_0 = 20$ ps, 1 = 30 km. Also shown are the numerically observed bifurcation points from our integrations of the NLSE. It can be seen that there is good agreement for small pulse widths (large interpulse spacings), which gradually diverges as the overlap between pulses becomes stronger. Some of the discrepancy will be accounted for by the fact that the separatrix must be sufficiently large to include the initial point before its presence is detected by the numerical simulation.

Thus it is clear that application of sufficient phase modulation will suppress soliton-soliton interactions. The analytical calculation of the critical value shows reasonable agreement with the numerically observed values. It is predicted that future trans-oceanic systems will have bit rates of the order of 10 to 20 gbit/s over lengths of 5,000 to 10,00 km.

$$L_{coll} = \int_o^{-T_o} \left( \frac{4\ddot{\beta}^2}{\tau^2} e^{-\frac{2T_o}{\tau}} (e^{-\frac{2\Delta T}{\tau}} - 1) - 2\alpha_{m2}\ddot{\beta}\Delta T \right)^{\frac{1}{2}} d\Delta T$$

where the pulse separation is $2T_0$, $\beta$ is the fibre dispersion, $\tau$ is the pulse 'sech' width; and $\alpha_{m2}$ is the phase modulator strength, ($\alpha_{m2}=\Phi\omega_2 m/2L_m$, where $L_m$ is the modulator spacing, $\Phi$ is the peak phase excursion and $\omega_m$ the angular drive frequency of the modulator).

The collision distances of soliton pairs in dispersion shifted fibre (ie with D–1 ps/nm/km) are, without phase modulation, as follows:

| Soliton Period $z_0$ Kilometers | Pulse Full Width ½ Maximum Picosecond | Bit Rate gbit/s | Collision Distance Kilometers |
|---|---|---|---|
| 40 | 10 | 5 | $10^9$ |
|  |  | 10 | 130,000 |
|  |  | 20 | 1,600 |
| 160 | 20 | 5 | $6 \times 10^5$ |
|  |  | 10 | 6,000 |
|  |  | 20 | 700 |
| 1,000 | 50 | 5 | 17,000 |
|  |  | 10 | 3,000 |
|  |  | 20 | 1,000 |

In a real system a safe margin would be to limit the system length to half the above distances. Moving to shorter pulse widths is not a universal panacea; it incurs other system penalties, notably Gordon-Haus jitter and "average soliton model" limits. Currently, a soliton pulse width (FWHM) of 20 ps is regarded as about optimum.

Clearly, an important benefit of controlling soliton-soliton interaction according to the invention is that the spacing between solitons can be reduced, thereby increasing the system bandwidth, even for long haul systems.

The phase modulators should be able to suppress interactions for any modulator spacing which is small compared to the interaction length, say a factor of 2 to 3. Nevertheless, the validity of the above quantitative predictions as to the required phase modulator strength are probably limited, for the numerical examples presented, to modulator spacings of up to about 50 km. That is, with modulator spacings of more than 50 km slightly more phase modulation may need to be imposed that is suggested in the above quantitative predictions.

While one could use electroptic or other electrically driven phase modulators, it is also possible to impose sufficient modulation using some all-optical system. Of course, with the electrically driven modulators some means needs to be provided to synchronise the modulation with the incoming pulse strength—that is some form of clock extraction is required to provide a suitably synchronised electrical signal. Again, recently developed all-optical clock extraction systems could be used to provide an optically driven phase modulator.

A suitable system for all-optical clock recovery is described in the Applicant's co-pending International patent application, application number GB93/00863 (Agent's ref: A24455) filed on 26 Apr. 1993, published as WO93/22855, and which is herein incorporated by this reference. The phase modulation required to be imposed in accordance with the present invention can of course be cross phase modulation.

It should also be noted that the present invention is applicable not only to solitons at a single wavelength but also to solitons of different wavelengths propagating down a common fibre.

In long haul soliton transmission systems as in FIG. 6, such as transoceanic submarine systems, it is likely that repeaters will be provided at approximately 30 to 50 kilometer intervals and will contain optical amplifiers 4 to keep the signal level sufficiently high. Typically, such amplifiers will be fibre-based devices, e.g. rare-earth doped fibre amplifiers (erbium fibre amplifiers are suitable for the 1.5 µm window, praseodymium for the 1.3 µm windows). Clearly in such systems it would make sense to incorporate within such repeaters the phase modulators required by the present invention. Of course where the requisite phase modulation can be provided by cross phase modulation within an optical fibre it is possible that part of the transmission fibre could provide the medium within which the phase modulation occurs and as such the relevant fibre portion might be within or outside a repeater.

Typically the soliton wavelength would be in the 1.5 micron (eg 1.55) transmission window of silica fibre—assuming the use of silica fibre as the transmission medium. A suitable soliton source for such systems is described in our co-pending international patent application WO 91/18593 (Agent's ref A24298) and the corresponding U.S. patent application 946464 (filed 18 Nov. 1992) which are herein incorporated by this reference.

We claim:

1. An optical communications system comprising a source of optical solitons coupled to an optical fibre transmission path, the optical fibre transmission path including multiple phase modulators which are modulated at a frequency such that adjacent solitons pass through upchirped peaks of the modulation cycle, the modulators inducing corrections to a soliton's frequency in response to changes in the soliton's temporal position caused by interaction forces, and wherein the phase modulators are provided along the transmission path, and the adjacent phase modulators are substantially equally spaced from each other.

2. An optical communications system as claimed in claim 1, wherein the solitons pass through consecutive upchirped peaks.

3. An optical communications system as claimed in claim 1, wherein the separation between adjacent phase modulators is between 30 and 60 km.

4. An optical communications system as claimed in claim 1 wherein the or each phase modulator is an electro-optic device.

5. An optical communications system as claimed in claim 1, wherein the or each phase modulator is an all-optical device.

6. An optical communications system comprising a source of optical solitons coupled to an optical fibre transmission path, the optical fibre transmission path including at least one phase modulator which is modulated at a frequency such that adjacent solitons pass through upchirped peaks of the modulation cycle, the modulator inducing corrections to a soliton's frequency in response to changes in the soliton's temporal position caused by interaction forces, and wherein the soliton width (FWHM) is not more than 10 ps and the or each phase modulator applies a positive phase modulation of at least 0.04 radians.

7. An optical communications system comprising a source of optical solitons coupled to an optical fibre transmission path, the optical fibre transmission path including at least one phase modulator which is modulated at a frequency such that adjacent solitons pass through upchirped peaks of the modulation cycle, the modulator inducing corrections to a soliton's frequency in response to changes in the soliton's temporal position caused by interaction forces, and wherein the soliton width (FWHM) is about 15 ps and the or each phase modulator applies a positive phase modulation of at least 0.065 radians.

8. An optical communications system comprising a source of optical solitons coupled to an optical fibre transmission path, the optical fibre transmission path including at least one phase modulator which is modulated at a frequency such that adjacent solitons pass through upchirped peaks of the modulation cycle, the modulator inducing corrections to a soliton's frequency in response to changes in the soliton's temporal position caused by interaction forces, and wherein the soliton width (FWHM) is about 20 ps and the or each phase modulator applies a positive phase modulation of at least 0.10 radians.

9. An optical communications system comprising a source of optical solitons coupled to an optical fibre transmission path, the optical fibre transmission path including at least one phase modulator which is modulated at a frequency such that adjacent solitons pass through upchirped peaks of the modulation cycle, the modulator inducing corrections to a soliton's frequency in response to changes in the soliton's temporal position caused by interaction forces, and wherein the soliton width (FWHM) is no more than 25 ps and the or each phase modulator applies a positive phase modulation of at least 0.10 radians.

10. An optical communications system comprising a source of optical solitons coupled to an optical fibre transmission path, the optical fibre transmission path including at least one phase modulator which is modulated at a frequency such that adjacent solitons pass through upchirped peaks of the modulation cycle, the modulator inducing corrections to a soliton's frequency in response to changes in the soliton's temporal position caused by interaction forces, and wherein adjacent solitons are separated by no more than 40 ps.

11. An optical communications system as claimed in claim 1 wherein an optical amplifier is provided in the optical fibre transmission path at or near the site of the or each phase modulator.

12. An optical communications system as claimed in claim 11, wherein each amplifier has bandwidth filtering means.

13. A method of propagating solitons along an optical fibre communications route, in which a positive phase modulation is periodically imposed on the solitons as they traverse the route, the amount of phase modulation which is imposed being sufficient to maintain the temporal separation between adjacent solitons such that significant soliton-soliton interactions are avoided, and wherein the phase modulation is imposed at equally spaced locations along the communications route.

14. A method as claimed in claim 13, wherein the degree of phase modulation imposed at any location is selected in dependence upon the soliton width.

15. A method of propagating solitons along an optical fibre communications route, in which a positive phase modulation is periodically imposed on the solitons as they traverse the route, the amount of phase modulation which is imposed being sufficient to maintain the temporal separation between adjacent solitons such that significant soliton-soliton interactions are avoided, and wherein the soliton width (FWHM) is about 20 ps and the degree of phase modulation imposed is at least 0.10 radians.

16. A method as claimed in any one of claim 13, wherein the phase modulation is imposed by electro-optic phase modulators.

17. A method as claimed in claim 13, wherein the phase modulation is imposed through cross-phase modulation.

* * * * *